United States Patent [19]
Reichert

[11] Patent Number: 5,558,260
[45] Date of Patent: Sep. 24, 1996

[54] DETACHABLE MOTORCYCLE PASSENGER SEAT AND/OR LUGGAGE RACK

[76] Inventor: Cory A. Reichert, 1315 S. Wasatch Dr., Salt Lake City, Utah 84108

[21] Appl. No.: 423,772

[22] Filed: Apr. 18, 1995

[51] Int. Cl.[6] .................... B62J 7/04; B62J 1/28
[52] U.S. Cl. .................... 224/413; 224/415; 224/416; 297/195.1
[58] Field of Search .................... 224/413, 415, 224/416, 423, 535, 42.31, 32 A

[56] References Cited

U.S. PATENT DOCUMENTS

| | | |
|---|---|---|
| 3,746,392 | 7/1973 | German . |
| 3,791,563 | 2/1974 | Raat ..................... 224/413 X |
| 3,795,354 | 3/1974 | Stippich ................ 224/32 A |
| 4,096,980 | 6/1978 | Clow .................... 224/413 X |
| 4,174,796 | 11/1979 | Nakamura ............ 224/413 X |
| 5,322,345 | 6/1994 | Desser .................. 297/214 |

*Primary Examiner*—Renee S. Luebke
*Attorney, Agent, or Firm*—Mallinckrodt & Mallinckrodt

[57] ABSTRACT

A method of matching an auxiliary passenger seat, luggage rack, combination of both, to a motorcycle requires adding short spacers to fender attachment bolts of the motorcycle; providing a seat having a plurality of hooks that mate with the spacers, and a plurality of latches; engaging the hooks of the seat to the spacers of the fender attachment bolts; and engaging the latches prevent the hooks from slipping off of the spacers.

13 Claims, 5 Drawing Sheets

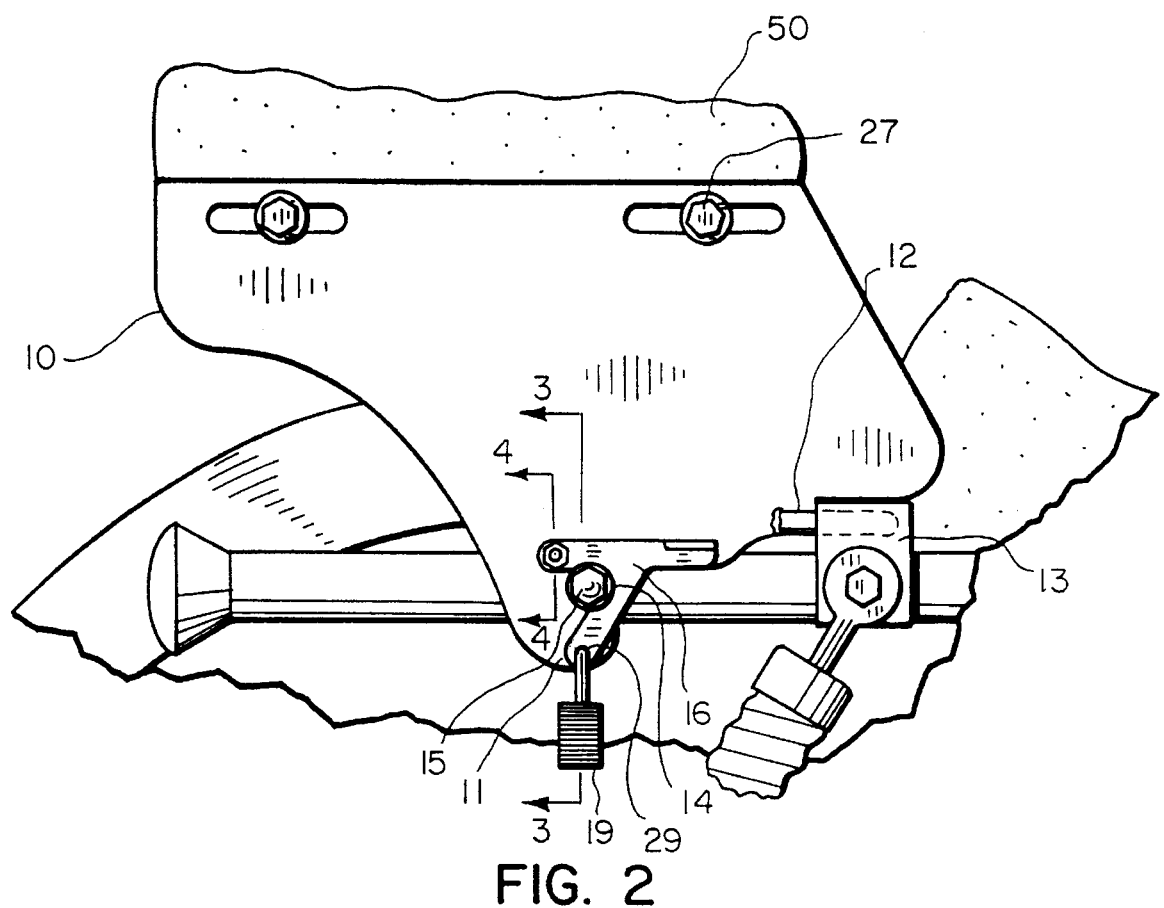
FIG. 2
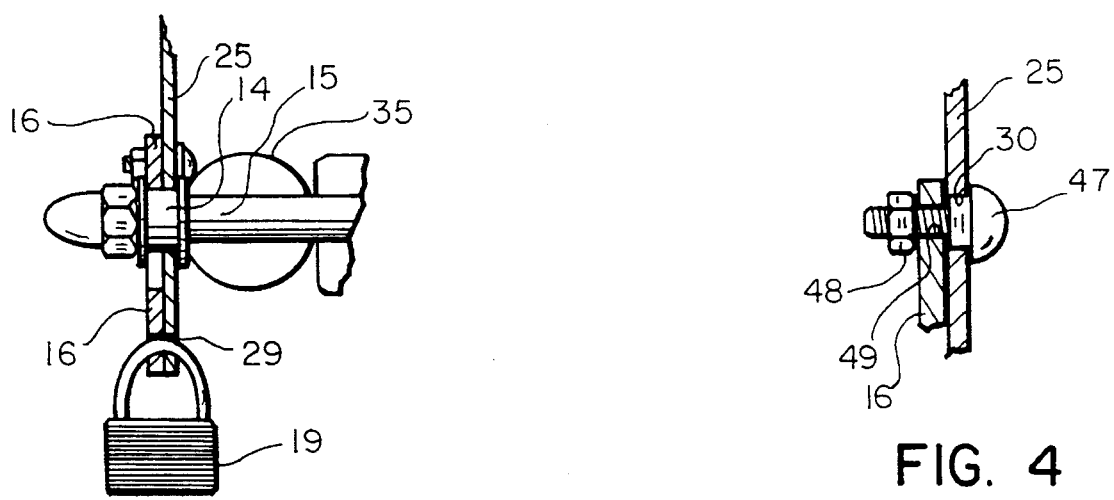
FIG. 3
FIG. 4

DETACHABLE MOTORCYCLE PASSENGER SEAT AND/OR LUGGAGE RACK

FIELD OF THE INVENTION

The invention relates to the field of detachable motorcycle passenger seats and luggage racks.

STATE OF THE ART

Owners of motorcycles require that their vehicle be versatile. At times, they may wish to carry passengers, at other or at the same times they may need to carry groceries, luggage, or other cargo, and at other times they may wish to restore their vehicle to an appearance as similar as possible to the appearance of the vehicle as it left the factory. There is a market, therefore, for passenger seats and/or luggage racks that may be readily removed from and reattached to the vehicle. Owners of classic motorcycles further require that the seat or luggage rack attach without damage to the motorcycle, such as would be required were it necessary to drill additional holes in any of the motorcycle components.

It would be advantageous for owners of such motorcycles if removal of an auxiliary passenger seat and/or luggage rack, or exchange of a seat for a luggage rack or vice versa, were quick, easy, and accomplished without tools. Further, it would be desirable if the seat and/or luggage rack were attached to the motorcycle so that a thief would require tools to remove such from the motorcycle.

A removable auxiliary passenger seat for motorcycles is shown by U.S. Pat. No. 5,322,345, issued to Desser, et al., in Jun. 21, 1994. The seat of Desser attaches to the rear fender of the motorcycle by way of several large suction cups. This seat may be subject to theft because there is no way of locking it to the motorcycle.

An auxiliary child's seat is shown by U.S. Pat. No. 3,746,392, issued to Lorrayne German on July 17 of 1973. This seat attaches to an open work metal luggage carrier by way of straps and seat material that deforms into the gaps of the luggage carrier under the occupant's weight.

SUMMARY OF THE INVENTION

The present invention comprises a removable motorcycle attachment base for a passenger seat, luggage rack, or both, that utilizes a pair of hooks with a pair of latches to removably secure each side of the attachment base to spacers and bolts installed in existing bolt holes in the vehicle. The base may further attach to the vehicle at additional points by means of a pair of pins and sockets, the sockets being attached to the vehicle by means of existing bolts for some models of motorcycles. This base is particularly adapted for installation on HARLEY DAVIDSON® motorcycle models having an outside shock absorber.

An alternate embodiment of the present invention intended to be attached to other models of motorcycles incorporates the same spacers, hooks, and latches as does the presently preferred embodiment, but does not incorporate pins and sockets. This base is further secured to the motorcycle by way of a pair of additional hooks mating to additional spacers, and is particularly adapted for installation on HARLEY DAVIDSON® "soft tail" motorcycles having an internal shock absorber.

To ensure secure attachment to the vehicle, the latches are held closed, thereby securing the seat in position, through use of a bolt and wing nut, or alternatively by way of a padlock. The seat may be removed from the motorcycle by removing the wing nut and bolt, or by removing the padlock, opening the latches, and sliding the seat off the motorcycle.

While the presently preferred embodiment of the present invention is designed to be attached to several models of HARLEY DAVIDSON® motorcycles, future embodiments may be adaptable to attachment to motorcycles of other makes and models.

THE DRAWINGS

The best mode presently contemplated for carrying out the invention is illustrated in the accompanying drawings, in which:

FIG. 1 is a perspective view of the presently preferred embodiment incorporating two latches with hooks and two pins, showing the manner in which the base attaches to a motorcycle;

FIG. 2 a right side view of the presently preferred embodiment incorporating pins shown mounted to a vehicle;

FIG. 3 a fragmentary cross sectional view of the latch, bolt, and spacer taken at 3—3 of FIG. 2;

FIG. 4 a fragmentary cross sectional view of the mounting of the latch taken at 4—4 of FIG. 2;

FIG. 5 a right side view of the alternate embodiment of the present invention required for motorcycles having no external shock absorber and spring assemblies;

FIG. 6 a perspective view of the presently preferred embodiment showing an attached small luggage rack;

FIG. 7 a perspective view of the presently preferred embodiment utilized as a luggage rack;

FIG. 8 a fragmentary horizontal right side view of an alternative embodiment of the latch and securing device;

FIG. 9 a fragmentary perspective view showing use of a pin and spring clip as a securing device;

FIG. 10 a fragmentary horizontal right side view of an alternative embodiment of the latch and securing device; and FIG. 11 a fragmentary horizontal right side view of an alternative embodiment wherein the function of the latch and securing device of the presently preferred embodiment is performed by a spring clip inserted in a hole drilled through the pin and socket that secures the base to the motorcycle.

DETAILED DESCRIPTION OF THE ILLUSTRATED EMBODIMENTS

Figure 1:
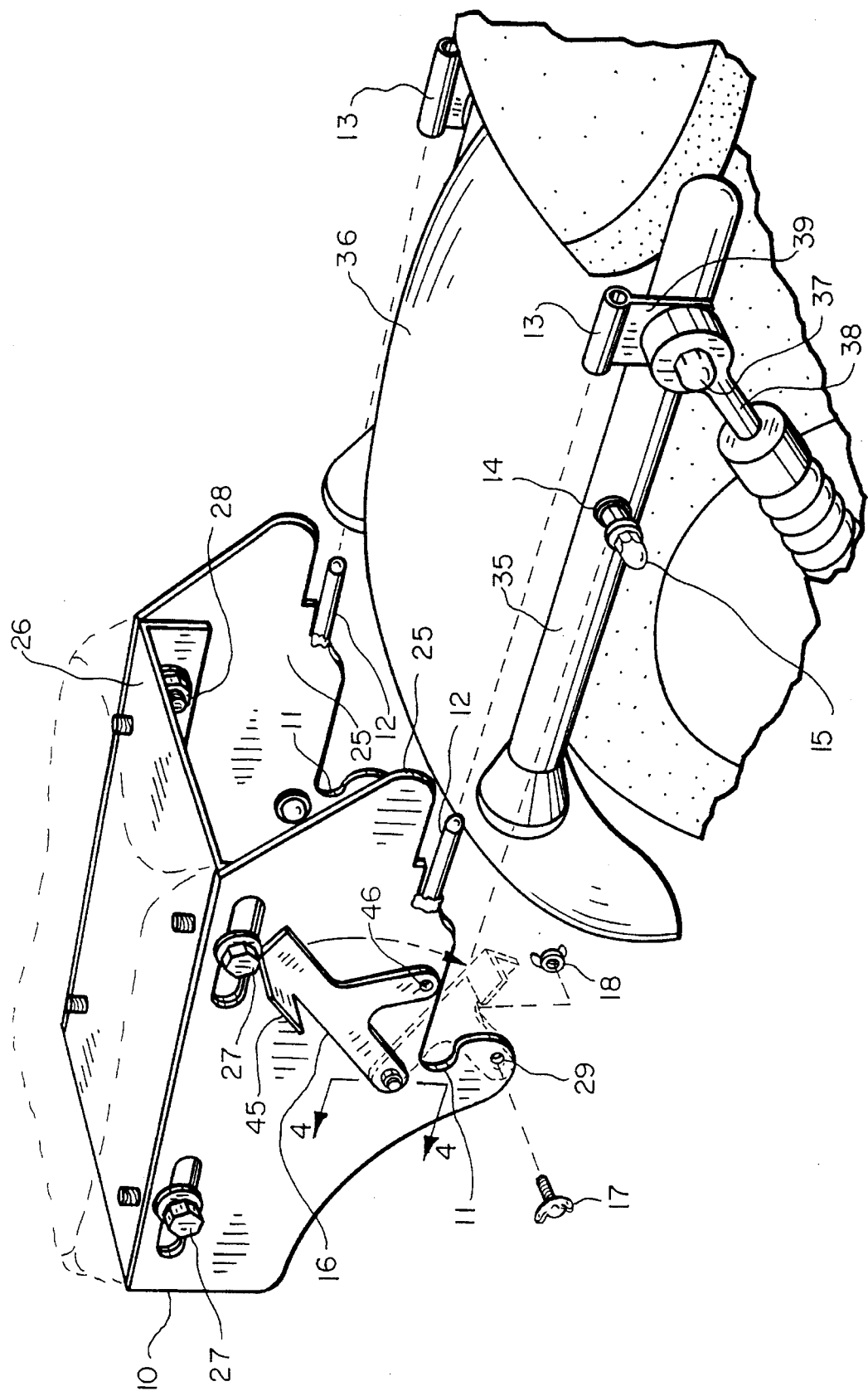

The present invention incorporates a seat or luggage rack supporting structure 10 having a plurality of hook portions 11 and a plurality of pins 12. The seat is attached to a motorcycle by inserting the pins 12 of the supporting structure into sockets 13 that are attached to the motorcycle, while engaging the hook portions 11 around spacers 14 fitted over bolts 15 that are attached to the motorcycle. Latch 16 is engaged about spacers 14 to prevent the base from sliding off the motorcycle while it is in use, the latches may be secured in place by way of a wing bolt 17 and wing nut 18, or by way of a padlock 19.

The supporting structure 10 of the base is preferably fabricated from one eighth inch sheet steel. The presently preferred embodiment is constructed of two side plates 25 and a top plate 26. The side plates 25 are attached to the top plate 26 by means of a plurality of bolts 27 and nuts 28. The side plates 25 and top plate 26 may be fabricated with lightening holes (not shown) so long as adequate material remains for strength. A pin of five sixteenths inch diameter steel 12 is attached to each side plate 25 of supporting structure 10, preferably by welding them to the side plates 25. Each side plate is fabricated with a hook section 11 having an opening sufficiently wide to engage a half inch diameter spacer 14, and has a hole 29 for a securing device and a hole 30 for attaching a latch.

The motorcycle is modified to permit attachment of the base by removing an existing bolt, normally used to mount the fender 36 to the motorcycle, which passes through a frame member of the motorcycle 35, and reinstalling a longer bolt 15 with a three-eights inch long spacer 14 surrounding the bolt 15. The motorcycle is further modified by removing a bolt 37 that attaches a spring and shock absorber assembly 38 to the frame of the motorcycle 35. This bolt 36 and shock absorber assembly 37 are reassembled to the frame 35 such that the bolt also passes through a mounting plate 39 for a socket 13. The mounting plate 39 is made of one eighth inch sheet steel, welded to the socket 13 comprising steel tubing of three eighths inch inner diameter and one half inch outer diameter. These modifications are performed to each side of the vehicle, such that two spacers and two sockets are added to the vehicle.

The latch 16 is also formed of one-eighth inch sheet steel. The latch is formed with a thumb flange 45 and a securing hole 46. The latch is pivotally attached to the supporting structure 10 by way of bolt 47 and self-locking nut 48, such that the bolt 47 passes through a hole 49 in the latch and hole 30 in the supporting structure 10. It is important that the latch be secured in such a manner that the base will not come loose from the motorcycle under the vibration and jolting of normal operation. The latch is secured about the spacer 14 through use of a wing nut 18 and wing bolt 17 or alternatively a padlock 19. A cushion 50 is attached to the top of the supporting structure.

The base may be readily removed from the motorcycle by unscrewing the wing nut 18, and removing the wing bolt 17, or unlocking and removing the lock 19. The base may then be slid backwards until the hook portions 11 of the supporting structure 10 disengage from spacers 14 and the pins 12 disengage from the sockets 13, at which point it may be lifted off the motorcycle.

Figure 5:
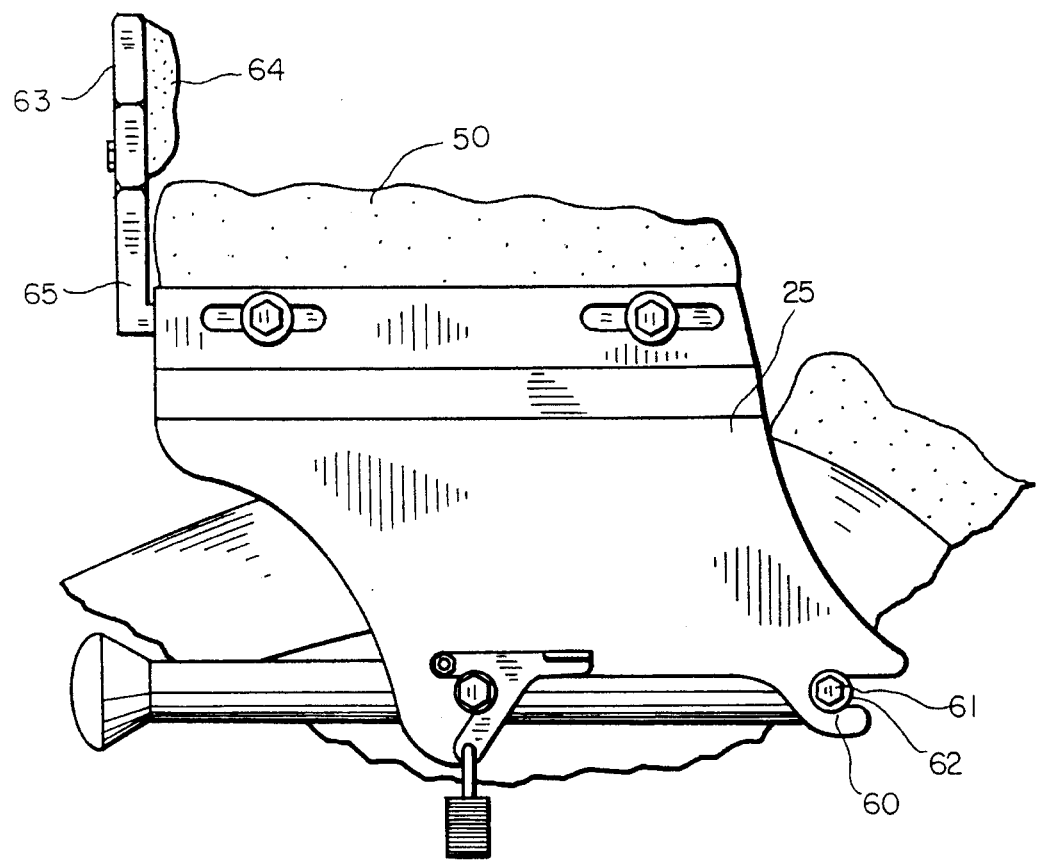

In an alternative embodiment of the present invention, as illustrated in FIG. 5, and as intended for use on those motorcycles lacking an external spring and shock absorber assembly 38, no sockets 13 nor pins 12 are used. The supporting structure 10 is mounted to the motorcycle by fabricating an additional hook portion 60 in each side plate 25, and modifying an additional fender attachment bolt on each side of the vehicle with an additional spacer 62. With this embodiment, a total of four spacers are added to the motorcycle.

The base may be readily removed from the motorcycle by unscrewing the wing nut 18, and removing the wing bolt 17, or unlocking and removing the lock 19. The base may then be slid backwards until the hook portions 11 of the supporting structure 10 disengage from spacers 14 and the additional hook portions 60 disengage from the additional spacers 62, at which point it may be lifted off the motorcycle.

Figure 6:
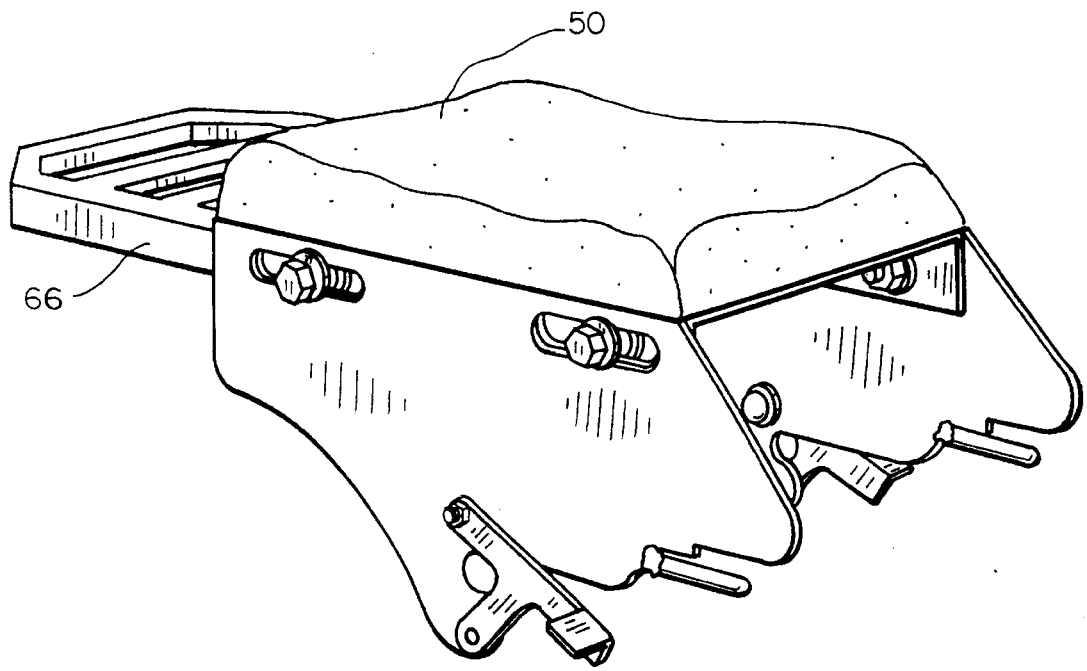
Figure 7:
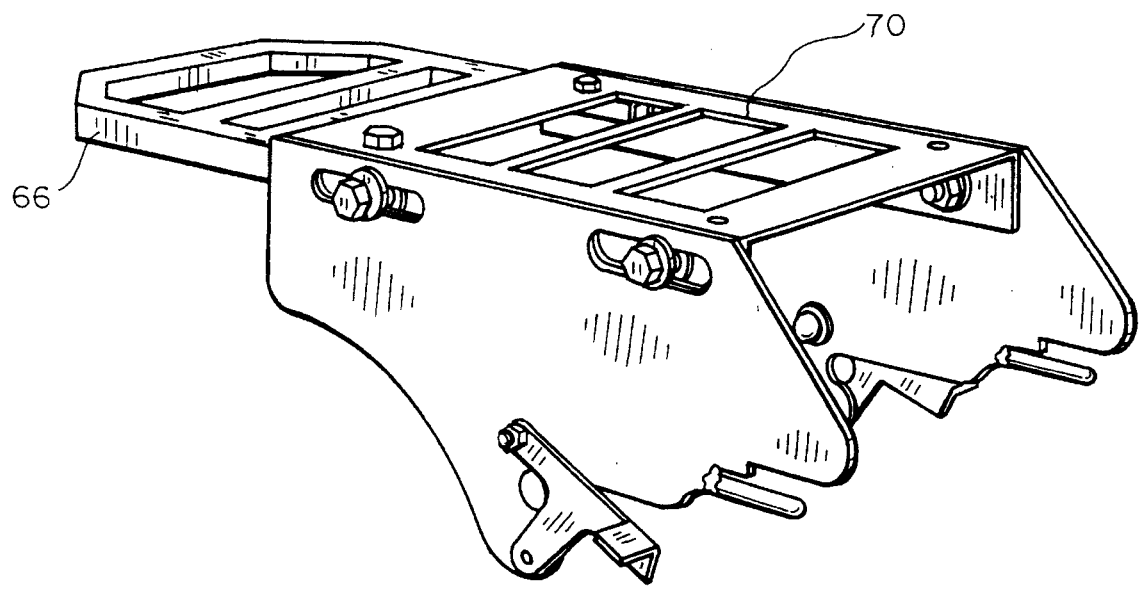

The base may function as a seat when a seating pad is attached to the top of the base. When used as a seat, the seat may further be fitted with a backrest 63 comprising a pad 64 attached to a mounting bracket 65 that is in turn bolted to the supporting structure 10. When used as a seat, the base may also have a small luggage rack extension 66 (FIG. 6) extending behind the seating pad 50, or the seating pad 50 may be left off such that the supporting structure 10, together with any luggage rack extension 66, comprises a luggage rack (FIG. 7). The lightening holes 70 in the top plate of the supporting structure and lightening holes (not shown) in the side plates of the supporting structure may serve for tying luggage to the rack, or panniers (not shown) may be fitted over or attached to the supporting structure.

Nothing in this application is intended to limit the scope of the present invention to the specific embodiment of the present invention illustrated. For example, an alternative embodiment of the present invention may incorporate a pin rotated at ninety degrees to the horizontal. In such an alternative embodiment, the base would be attached to the motorcycle by first engaging the hooks with spacers, then rotating the base upon the hooks until the pins engage in the sockets.

Similarly, in an alternate preferred embodiment, wing bolt 17 may be replaced by a carriage bolt that inserts in a square opening. The square base of the carriage bolt will keep it from rotating when the motorcycle owner twists the wing nut 18 to loosen the nut. Further, the base supporting structure 10 may be constructed from a single piece of metal instead of the illustrated construction of two side plates 25 and a top piece 26 bolted together.

Figure 9:
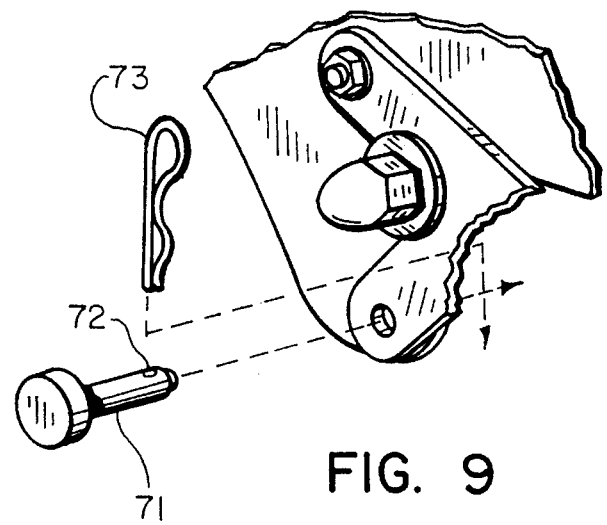

The securing device for the latch 16 may take a number of forms besides those illustrated. In one alternative preferred embodiment, the securing device takes the form of a pin 71 having a hole 72 near its tip, similar in shape to a clevis pin as used on farm equipment. A spring clip 73 (FIG. 9) snaps into the hole at the tip of the pin to hold the pin 71 in place. The pin 71 will then secure the latch. A spring-loaded catch (not shown) may also be used to retain the latch in position.

Figure 11:
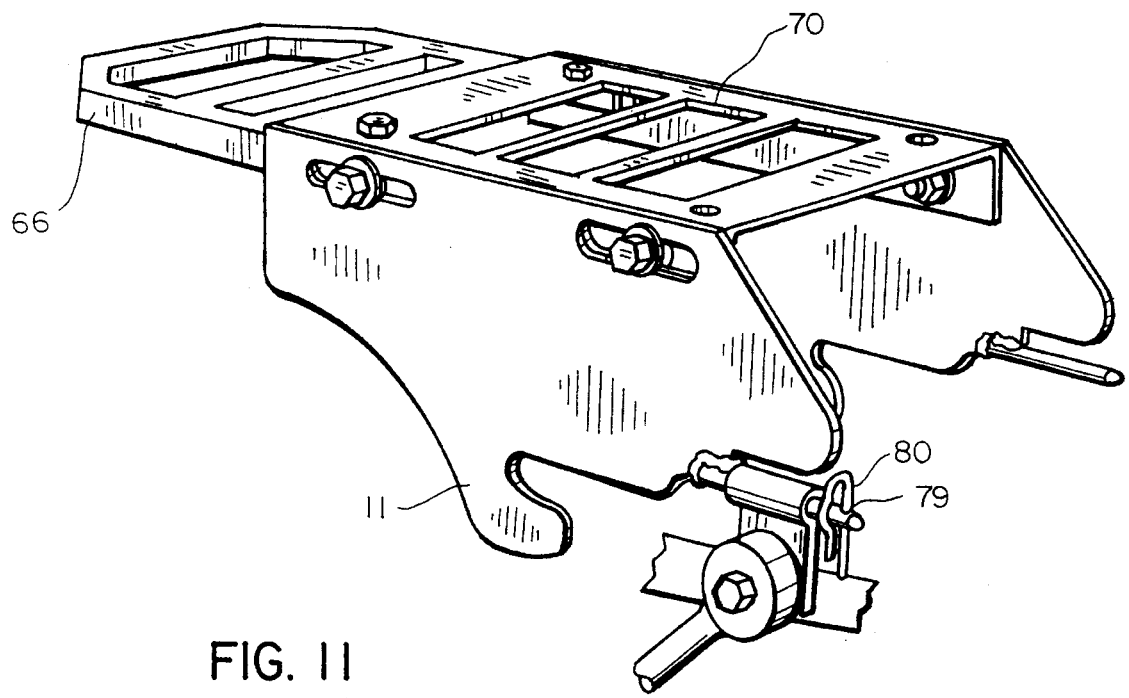
Figure 8:
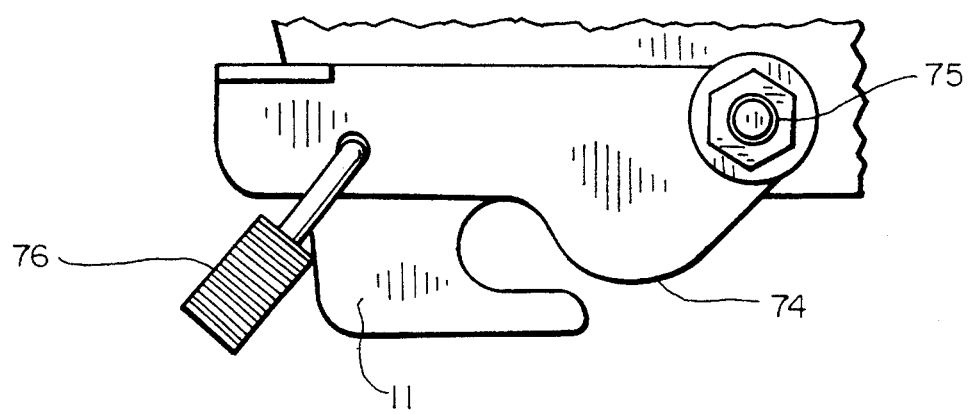
Figure 10:
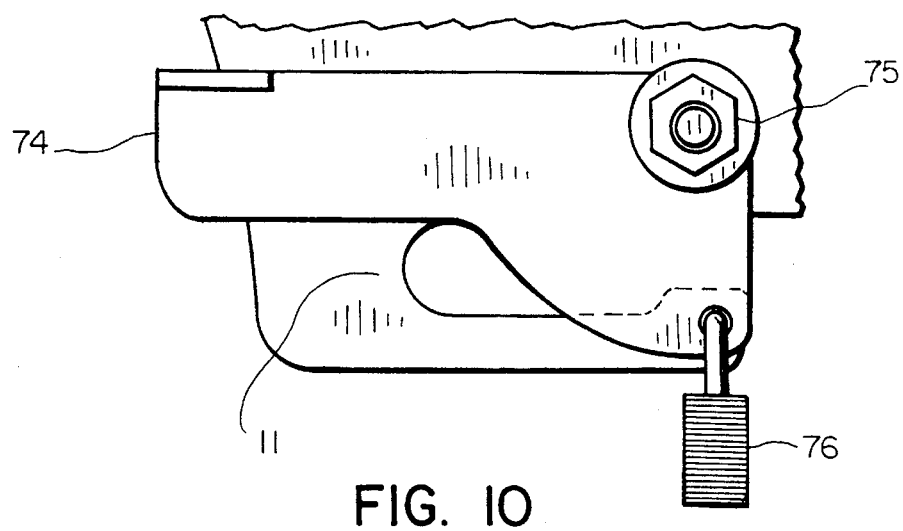

The latch may take a number of variant forms. FIG. 8 shows an alternative latch 74 having a pivot 75 located forward of the hook portion 11 that supports the supporting structure 10. While this may appear sufficient to hold the base in place, it has been found that the latch 74 may work loose under vibration if it is not retained in place by a securing device, such as padlock 76, as is required with the latch of the presently preferred embodiment. Another possible arrangement of the securing device is shown in FIG. 10. Yet another possible method for securing the supporting structure 10 to the motorcycle is shown in FIG. 11, wherein the pins 12 have holes 79 drilled to receive spring clips 80. The spring clips 80 serve to retain the pins 12 in sockets 13 and prevent the base from sliding off of the motorcycle. If the pins 12 and holes 79 are of sufficiently large diameter, a padlock may also be used to retain the pins 12 in sockets 13 and thereby retain the base on the motorcycle.

The pivotable attachment of the latch 16 to the base supporting structure 10 need not be by means of the bolt and nut shown; a heavy duty rivet with a spacer may also serve to form a pivotable attachment. If the bolt 47 is drilled, the self-locking nut 48 may be replaced by either a castle nut over an ordinary nut, or a nut having a hole, and the nut secured in position by a cotter pin (not shown). Similarly, it may be possible to fabricate the supporting structure top portion 26 with a luggage rack extension 66 as one piece.

Another embodiment of the present invention may utilize a second bolt 61 and spacer 62 inserted in a hole in the frame of the motorcycle other than a hole for a preexisting fender attachment bolt. The side plates 25 must be suitably shaped to reach the bolt 61 position.

The spacers inserted over the bolts in the present invention may be replaced by a single component having a head of large diameter, a spacer section of intermediate diameter, and a threaded section of lesser diameter.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A method of attaching a base for an auxiliary passenger seat, luggage rack, or combination thereof to a motorcycle, comprising the steps of:

adding spacers to a plurality of fender attachment bolts of the motorcycle;

providing a base having a plurality of hooks and a plurality of latches;

engaging the hooks of the base to the spacers of the fender attachment bolts; and engaging the latches with the spacers to prevent the hooks from slipping off the spacers.

2. The method of claim 1, further comprising the steps of: providing the base with a plurality of pins; adding a plurality of sockets to bolts of the motorcycle; engaging the pins of the base with the sockets while engaging the hooks upon the spacers.

3. The method of claim 2, further comprising the step of: securing at least one of the latches in the engaged position with a device selected from the group consisting of a bolt and wing nut, a pin and spring clip, a spring loaded catch, and a padlock.

4. The method of claim 2, further comprising the step of:

securing at least two latches in the engaged position, each with a device selected from the group consisting of a bolt with a wing nut, a pin with a spring clip, a spring loaded catch, and a padlock.

5. A base for an auxiliary passenger seat, luggage rack, or both for a motorcycle comprising:

a supporting structure having a plurality of hook members adapted to be engaged with spacers inserted over bolts of the motorcycle;

a plurality of latches attached to the supporting structure adapted to prevent the hook members from sliding off of the spacers when the latches are secured;

a plurality of securing devices for the latches.

6. The base for a motorcycle of claim 5, further comprising a plurality of pins attached to the supporting structure adapted to be inserted in sockets attached to bolts of said motorcycle.

7. The base for a motorcycle of claim 6, further comprising a pad attached to the supporting structure.

8. The base of claim 6, further comprising a seating pad and a luggage rack.

9. The base of claim 6, further comprising seating pad and a backrest.

10. A motorcycle comprising:

a frame;

a plurality of wheels rotatably attached to the frame;

a steering mechanism by which at least one of the wheels may be steered;

a fender covering one of the wheels, where the fender is securely attached to the frame by a plurality of fender attachment bolts;

a plurality of spacers disposed about a plurality of the fender attachment bolts;

a supporting structure having a plurality of hook members, wherein the hook members are engaged upon the spacers.

11. The motorcycle of claim 10, wherein the wheel covered by the fender is attached to the frame by means comprising a shock absorber and spring assembly, where the shock absorber and spring assembly is attached to the frame of the motorcycle with a bolt; and further comprising:

a socket attached to the bolt that attaches the frame of the motorcycle to the shock absorber and spring assembly, where the socket is adapted to receive a pin that is disposed upon the seat supporting structure such that the pin and socket assists in attaching the supporting structure to the motorcycle.

12. The motorcycle of claim 11, wherein the supporting structure is retained upon the frame by a spring clip inserted through a hole in the pin.

13. A motorcycle comprising:

a frame;

at least two wheels rotatably attached to the frame;

a steering mechanism by which at least one of the wheels may be steered;

an internal combustion engine by which at least one of the wheels may be driven;

a plurality of bolts attached to the frame;

a plurality of spacers disposed about a plurality of the bolts;

a supporting structure having a plurality of hook members, wherein the hook members are engaged upon the spacers;

latch means engaging at least one spacer by which the hook members are retained upon the spacers;

at least one securing device that secures the latch means in position.

* * * * *